United States Patent
Lagergren (10) Patent No.: US 7,610,580 B2
(45) Date of Patent: *Oct. 27, 2009

(54) SYSTEM AND METHOD FOR ITERATIVE CODE OPTIMIZATION USING ADAPTIVE SIZE METRICS

(75) Inventor: Marcus Lagergren, Stockholm (SE)

(73) Assignee: BEA Systems, Inc., Redwood Shores, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 11/177,549

(22) Filed: Jul. 8, 2005

(65) Prior Publication Data

US 2005/0246699 A1   Nov. 3, 2005

Related U.S. Application Data

(63) Continuation of application No. 10/727,202, filed on Dec. 3, 2003, now Pat. No. 6,964,042.

(60) Provisional application No. 60/434,078, filed on Dec. 17, 2002.

(51) Int. Cl.
*G06F 9/45* (2006.01)

(52) U.S. Cl. .................................................. 717/153
(58) Field of Classification Search ................. 717/153
See application file for complete search history.

(56) References Cited

U.S. PATENT DOCUMENTS

| 4,947,319 | A | 8/1990 | Bozman ..................... 711/118 |
| 6,078,745 | A | 6/2000 | DeGreef et al. ............. 717/151 |
| 6,237,141 | B1 * | 5/2001 | Holzle et al. ................ 717/153 |
| 6,445,458 | B1 | 9/2002 | Focazio et al. .............. 358/111 |
| 6,971,091 | B1 * | 11/2005 | Arnold et al. ............... 717/145 |
| 2001/0032332 | A1 | 10/2001 | Ward et al. | |
| 2004/0064809 | A1 | 4/2004 | Liu et al. | |
| 2004/0073904 | A1 | 4/2004 | Hill | |

* cited by examiner

*Primary Examiner*—John Chavis
(74) *Attorney, Agent, or Firm*—Fliesler Meyer LLP (57) ABSTRACT

A system and method for iterative code optimization using adaptive or dynamic size metrics, for use with run-time software systems and virtual machines. The dynamic size metric may be calculated both for a set of predetermined factors (together with associated weights), and also for a set of variable factors determined during the runtime code introspection process. The predetermined factors, and their associated weights, may be varied to reflect the overall performance of the code in each optimization instance.

17 Claims, 6 Drawing Sheets

SYSTEM AND METHOD FOR ITERATIVE CODE OPTIMIZATION USING ADAPTIVE SIZE METRICS

CLAIM OF PRIORITY

This application is a continuation of U.S. patent application "SYSTEM AND METHOD FOR ITERATIVE CODE OPTIMIZATION USING ADAPTIVE SIZE METRICS", application Ser. No. 10/727,202, filed Dec. 3, 2003, which claims the benefit of U.S. provisional application "SYSTEM AND METHOD FOR ITERATIVE CODE OPTIMIZATION USING ADAPTIVE SIZE METRICS", Application No. 60/434,078, filed Dec. 17, 2002, each of which applications are incorporated herein by reference. Application Ser. No. 10/727, 202 is now U.S. Pat. No. 6,964,042.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to run-time software systems, and particularly to a system and method for iterative code optimization using adaptive size metrics.

BACKGROUND

In a computer system, or in any system that operates computer software, the size of the application code that runs thereon has a critical impact on the overall performance of the system. Larger application codes take up more memory space and utilize more system resources than smaller application codes. With an increase in application code size, and a decrease in available system resources, the performance of the system is greatly reduced. As more and more system vendors find that the distinguishing feature between their product and a competitors often hinges on the relative performance of their products, the need to increase system performance at every level is increasingly more important in today's environment.

The size of a particular piece of application code is not necessarily static over time. In many instances, the application code is recompiled again and again, sometimes for performance reasons, or for failover reasons. In static systems, this compilation process may only happen intermittently, whereas in a dynamic system such as in a Java virtual machine (JVM) environment, the recompilation process may happen almost continuously. With each recompile, the application code is altered or modified in some way to reflect the current state of the system.

An important goal of the recompilation process in a Java virtual machine or other dynamic environment, is to generate new application code on the fly, such that the new application code operates with greater performance than the previous code i.e., either in a smaller memory space, or with faster performance, or in using less of the available resources. An important goal of all recompilation processes as they are used in this manner to optimize the performance of the application code, is that they should not result in some decrease in performance. A common method of optimizing application code during compilation, is to "in-line" frequently called methods within the body of the application code itself, i.e., replacing calls to external methods with spliced inserts of those external methods in the application code itself, thus reducing the number of call overheads to external methods. An obvious problem with this approach is that as each method segment is spliced into the application code, the original application code greatly increases in size, often referred to as "code bloat", so that the net effect may be no performance increase at all. The developer must at all time be attuned to the varying needs of the system in maximizing application execution speed, while minimizing code bloat. The overall effect is a balancing one, in which application code size limits the types and frequency of optimizations the system can perform.

Furthermore, traditional systems rarely take into account any form of dynamic optimization, such as how an application code may be optimized to better address the running environment. The traditional method of code optimization is to monitor the size of the application code in memory and to perform optimizations to keep the application code within a certain memory size range. However, none of these techniques of code optimization address the individual needs of particular environments, or of virtual machines running in these environments.

SUMMARY

The invention is generally related to run-time software systems, and particularly to a system and method for iterative code optimization using adaptive size metrics. In one embodiment, the invention provides a system for performing adaptive optimization of application code within a virtual machine environment that uses a run-time compiler to compile application code for use by the virtual machine, the system comprising; an optimizer which utilizes optimization parameters to calculate a dynamic size metric for the application code, and which size metric is then used to perform application code optimizations during run-time; and, a feedback mechanism which uses information from the run-time compiler to determine at least some of said optimization parameters. In another embodiment the invention provides a method, or part thereof, for performing adaptive optimization of application code within a virtual machine environment that uses a run-time compiler to compile application code for use by the virtual machine, the method comprising the steps of: gathering information about an application code and optimization parameters during run-time; passing said information via a feedback mechanism to an optimizer; calculating a dynamic size metric for the current application code using said optimization parameters; and, optimizing the application code based on the dynamic size metric.

DETAILED DESCRIPTION

The present invention provides a system and a method for performing code optimization in a run-time system, in which the code is optimized in accordance with a varying size metric, that can be dynamically modified using feedback information. As used herein, the term "code" is used to refer to any code including application methods that are stored in the memory in a computer system or any other run-time environment including, for example, a java virtual machine (JVM) or any other virtual machine. While the system is running, information is continuously gathered by the system about the application code running thereon, and this information is then used to perform optimizations on the running code. In this way, the system can identify bottlenecks wherein the application code or program spends most of its time, and can then choose to only optimize those bottlenecks. The net result is an improvement in application code performance, while minimizing the amount of time required in optimizing the application code. The use of dynamic size metrics, as distinct from static size metrics as traditionally used, allows the system to tailor the optimization process to best address the needs of the underlying architecture, for example whether the hardware is an Intel platform, or a Sun Sparc platform. Optimization parameters can be tweaked to best address the underlying system architecture and virtual machine or application code being used.

Figure 1:
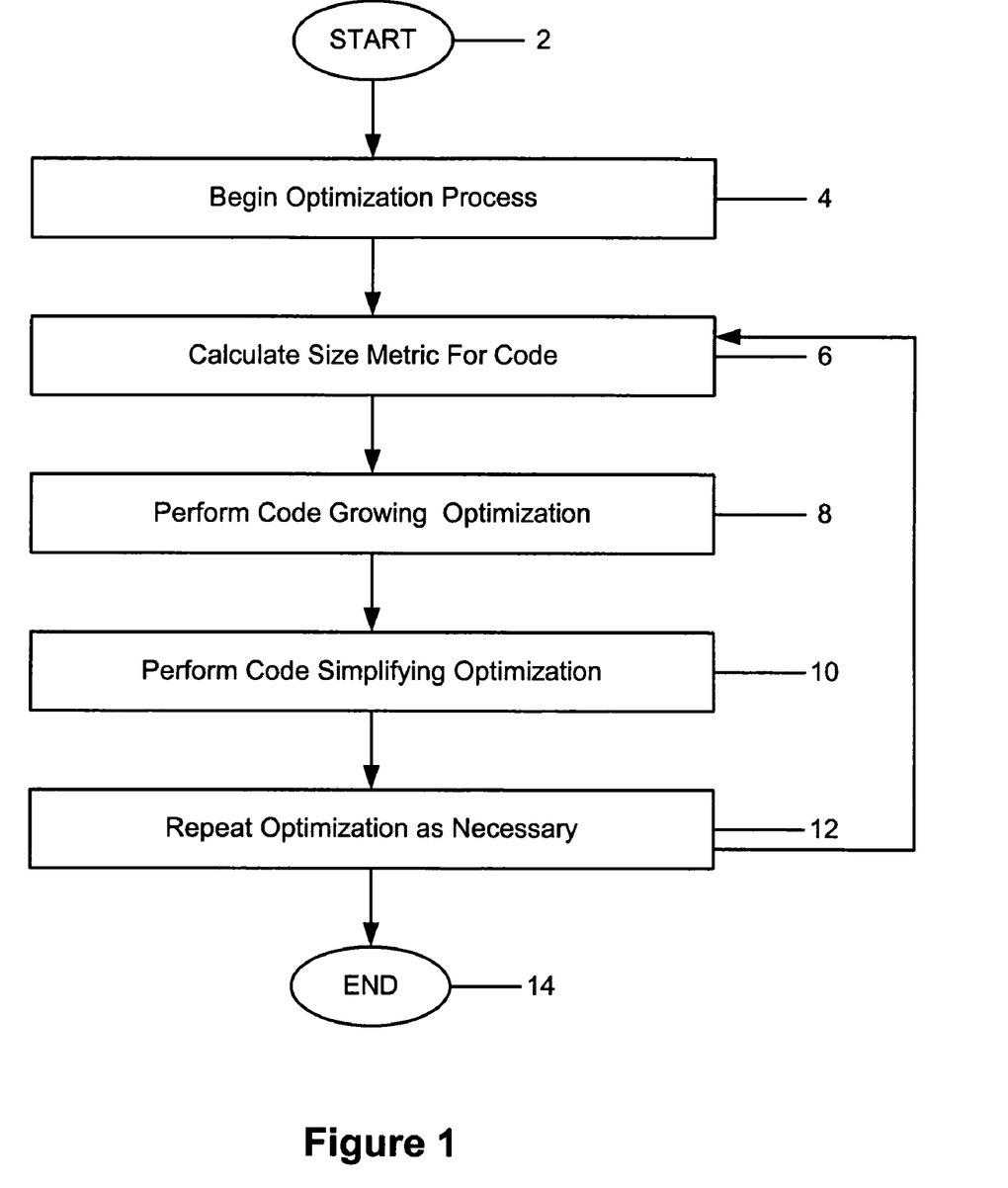
FIG. 1 illustrates a flowchart showing an optimization process as may be found in the prior art.

FIG. 1 illustrates a process wherein the size of the application code is used as the size metric for performing the optimization. As shown in FIG. 1, following a start step 2, the optimization process begins in step 4. In a static system the optimization process may begin as a discreet step, whereas in a run-time system the optimization process step may run continuously. In step 6, a size metric function is used to calculate a size metric for the current application code. How the size metric is calculated is dependent on the system but may for example be a linear function of the number of basic blocks and operation tuples within the code itself. A typical optimization process first performs, in step 8, a code growing optimization. This may involve in-lining various methods within the application code to reduce the number of call overheads to those methods. Each in-lining includes splicing a portion of the application code within the code itself, so that all calls can be made locally without referring to other portions of memory. The problem with application code in-lining, is that the application code necessarily grows with each in-lining iteration. In step 10, once the code growing optimization has been performed, the system typically performs a simplifying optimization that is used to shrink the code size and to optimize sections that may have been brought into the code in a previous step. The optimization process is then repeated, in step 12, as necessary.

The summary of a traditional code optimization process is defined below, wherein S is a size metric function for the code. A large piece of code will yield a larger size metric. S might be computed e.g., as a linear function of the number of basic blocks and operation tuples in the code. Then, while changes occur and $$S(code) < S(\text{original code size}) \times \text{Growth Factor}$$

the process:
1. Performs code growing optimizations, i.e., in-lining, until the size metric reports that the code has reached a growth boundary.
2. Performs code simplifying optimizations to shrink code size and optimize those sections brought into the code.

However, one of the problems with the method described above as it is applied in a traditional system, is that it fails to take into account the current system environment, nor does it address the fact that certain environments require slightly different optimizations in order for the code to perform optimally. Typically, in order to perform this type of optimization the code would need to be frozen and then thoroughly analyzed. However, in a run-time system such as a JVM, the application code cannot simply be stopped, analyzed, and recompiled. The recompilation in a run-time system is typically of the order of milliseconds. A key goal then, is to maximize code performance while minimizing the time spent on analyzing and optimizing the code. This will necessarily take into account all application code factors including, but not limited to, code size, in-lining, and how the code reflects the underlying architecture.

Figure 2:
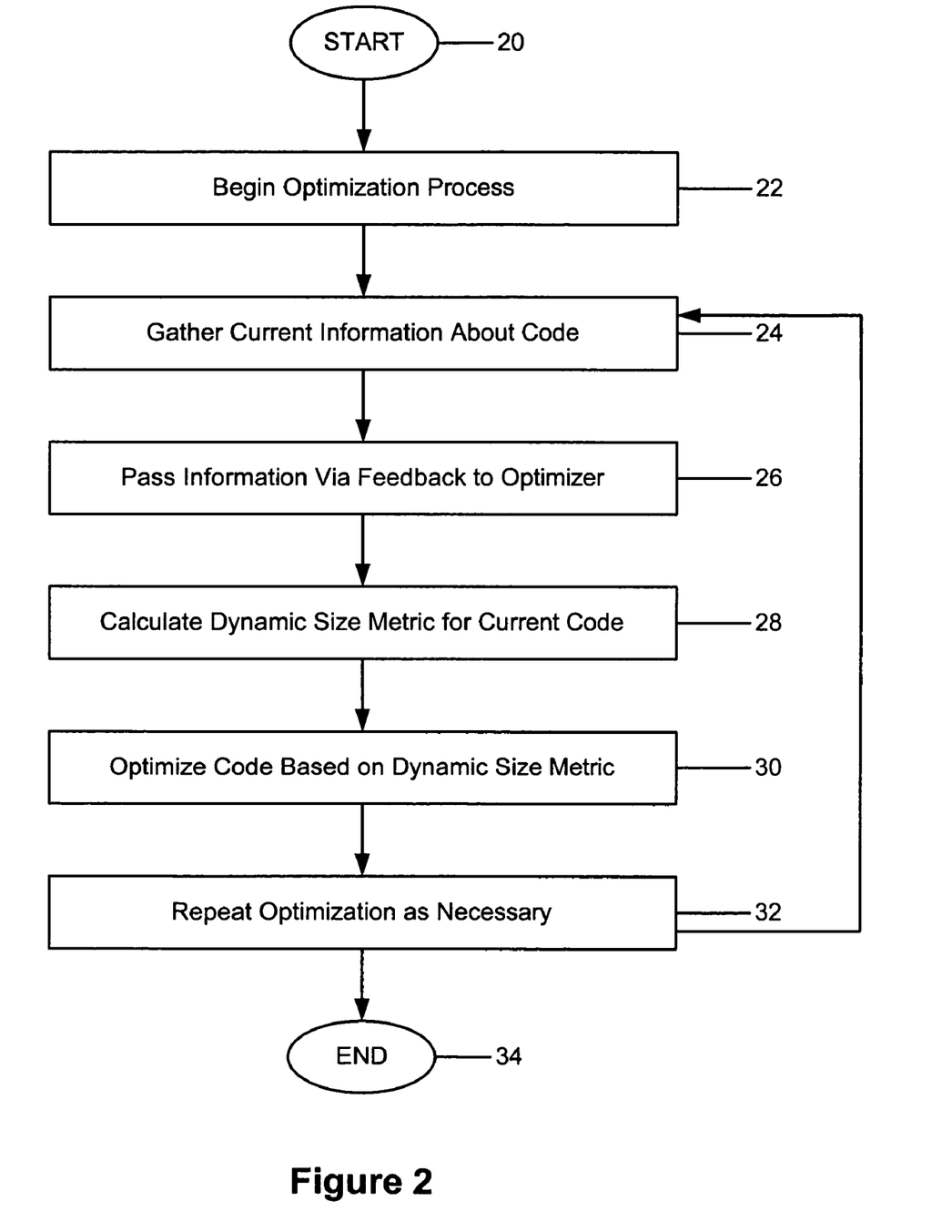
FIG. 2 illustrates an optimization process in accordance with an embodiment of the invention.

FIG. 2 illustrates a flowchart of a process in accordance with an embodiment of the invention, in which information received from the run-time system while the application code is executing is used to provide feedback to the run-time system to optimize the application code running thereon. As shown in FIG. 2, following an initial start step 20, the optimization process properly begins in step 22. While the run-time system is functioning, information is continuously gathered about the performance of the system and the code running thereon, in step 24. This is a typical feature of run-time system, such as a JVM. In step 26, the performance information is passed by a feedback mechanism to the code optimizer. In step 28, the optimizer calculates a dynamic size metric for the current code. This is distinct from the static size method used in traditional methods, that typically focus only on the size of the application code and fail to take into account any dynamic factors that may affect the size metric from one optimization instance to another. In step 30, the code is optimized based on this dynamic size metric. In step 32, the optimization process is repeated as necessary in order to best maximize the performance of the running application code.

As described above, information is used from the run-time system in order to provide feedback to the optimizer for use in optimizing the application code. This information is received from the run-time compiler. Being able to address this information is a key feature of the present invention. As mentioned briefly above, the traditional approach of using size metrics when optimizing is to utilize a number of fixed parameters, for example growth factors, that work reasonably well for all types of optimizations. This is analogous to providing a round hole for all code sections to pass through, even though some code sections may be square. Having such a standardized method of optimization does not allow for aggressive code growth optimizations in that all code sections are handled the same way, whereas a more efficient optimization system must address the different nature of different code sections. While in a static system, the size metric is used primarily because it is the only reasonable method, in a run-time system additional information is generated by the run-time system and the run-time compiler, and it is this additional information that is of most use during the optimization process.

Figure 3:
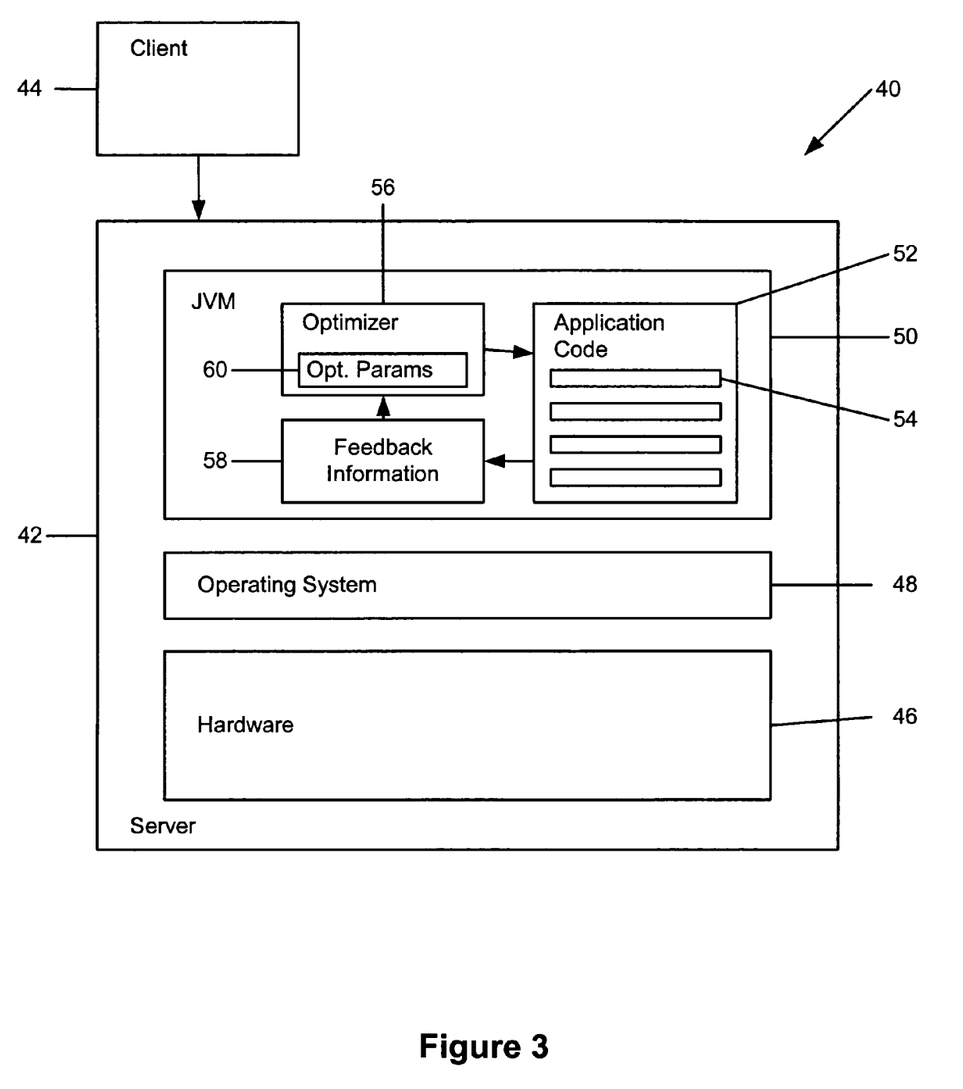
FIG. 3 illustrates a schematic of a computer based system including a dynamic run-time environment, that may incorporate an embodiment of the invention.

FIG. 3 illustrates a schematic of a system in accordance with an embodiment of the invention, that uses feedback information from the run-time compiler in order to optimize the application code running on the run-time system. As shown in FIG. 3, a typical server includes hardware 46 and operating system 48 components. On top of this runs the run-time environment 50, in this instance a JVM, although other run time systems environments, or virtual machines may be envisaged. The application code 52 exists on the memory space of the run-time system in the form of application code segments 54, which may correspond to particular methods or other application code sections. As the run-time system operates in response to client requests, etc., the application code is recompiled almost continuously. In accordance with this embodiment of the invention, at each compile step, the run-time compiler provides feedback information 58 to an optimizer 56, which the optimizer then uses to perform an optimization on the application code in run-time. The optimizer also utilizes optimization parameters 60 to effect the optimization. Optimization parameters can be previously determined and specified by a developer who has knowledge of the various characteristics of the underlying system and the various needs of this run-time environment, or alternatively the optimization parameters can be automatically calculated from the feedback information 58. In this way, the system makes the best use both of the developers personal knowledge of the system upon which the JVM will operate, and also on the system being able to dynamically calculate variables that should be taken into account during the optimization process, but which may vary from one system or platform to another. For example, the system can alter the optimization parameters between an Intel IA64 hardware platform, or a Sun Sparc hardware platform, in which the optimization may necessarily be different because of the different register types and numbers in each of these architectures, and not just on a static level.

Figure 4:
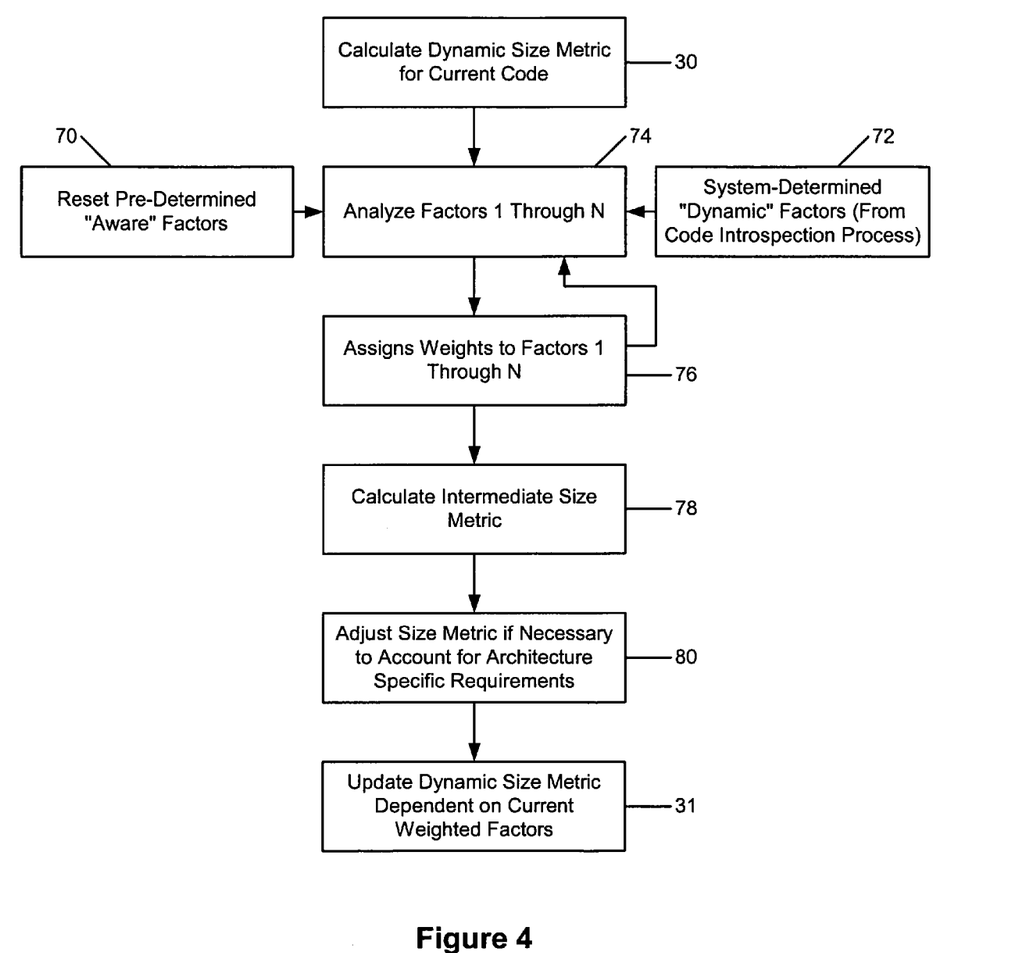
FIG. 4 illustrates a flowchart of a dynamic size metric process in accordance with an embodiment of the invention.

FIG. 4 illustrates a flowchart of a process in accordance with an embodiment of the invention that illustrates how a dynamic size metric is calculated utilizing both predetermined and system-determined factors. In step 30, which corresponds to step 30 of FIG. 2, the process begins with a request to calculate a dynamic size metric for the current application code. The system utilizes a set of factors in order to calculate the dynamic size metric. As shown in FIG. 4, these factors are illustrated as steps 70 and 72 respectively. In particular, in step 70, the system retrieves any predetermined factors, i.e., factors that the system is aware of from the initial stage onwards. These factors reflect important parameters that the developer or system administrator should always know are an important factor in optimizing application code for this environment. In step 72, the system also determines factors in a dynamic manner using a code introspection process, referred to herein as "dynamic factors". These dynamic factors are determined during run-time using information from the feedback mechanism. The output of the code introspection process is a number of factors, together with associated weights, that are then used by the system in calculating the size metric. In this manner the otherwise static size metric as is found in traditional optimization methods, is replaced with a dynamic size metric S. S is thus a function of factors that the feedback mechanism supplies after an analysis of a specific size of code has been performed. For example, the feedback mechanism may always choose parameters like basic block count and operation tuple count together with similar weights. The weight coefficients determine how important this particular parameter is to the system performance. In some instance, feedback information might suggest, for example, that register pressure is an important factor depending on how the code looks. In other instances a pattern detector may weigh certain recognized patterns as being either more efficient or less efficient code growth-wise. For example, some object oriented proxy patterns will benefit from aggressive in-lining, and this preference for aggressive in-lining can be accounted for in calculating the size metric. Weights for the same factor may dynamically vary between optimization instances. In step 74, each of the determined factors 1 though N, both the predetermined factors and system determined or dynamic factors, are analyzed by the system. In step 76, weights are assigned to each of the N factors. The intermediate size metrics is then determined in step 78, and in step 80 is adjusted when necessary to account for architecture specific requirements. For example, the size metrics may be modified slightly when a particular architecture is used that is known to have a great dependency on register pressure. In step 31, the dynamic size metric is updated-dependant upon the current set of weighted factors.

Figure 5:
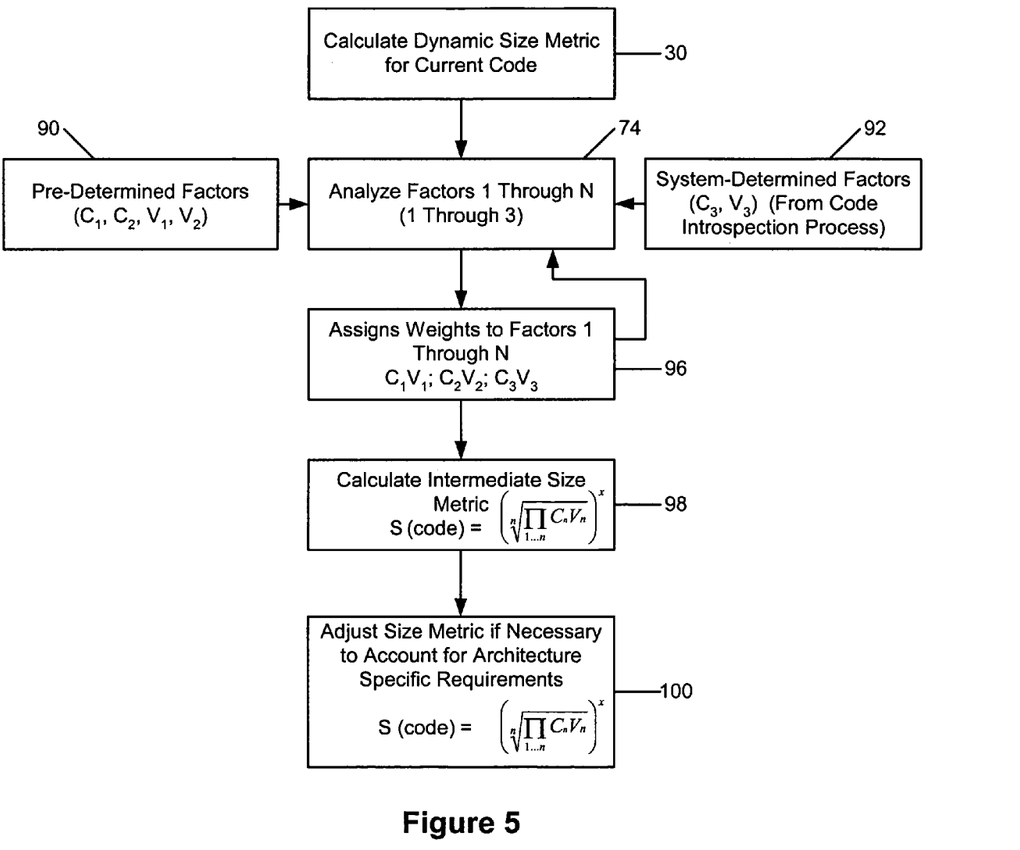
FIG. 5 illustrates a flowchart showing an example of how a dynamic size metric is calculated in accordance with an embodiment of the invention.

FIG. 5 illustrates an example of how the dynamic size metrics may be calculated for a number of predetermined factors together with associated weights, and also system determined factors from the code introspection process. In step 30, the dynamic size metric is calculated for the current code. This includes a step 90 of retrieving those predetermined factors or variables $V_1$, $V_2$, and their associated weights, $C_1$ and $C_2$ which have been previously determined as having an effect on the overall performance of the code. System determined factors, including $V_3$ and it's associated weight $C_3$, may be determined by a code introspection method and are read into the system in step 92. In step 94, each of these factors (1 though 3) are analyzed, and their associated weights given to each factor, in step 96. In step 98 the intermediate size metric S is calculated for this particular application code, and in step 100 the size metric is adjusted where necessary to account for any architecture specific requirements. For example, the "x" exponent shown in step 100 provides that large values of S are very large (i.e., when x is greater than 1), which in this instance will contribute more to the growth factors. This technique is useful where for example, code bloat matters a lot, which is the case on some underlying architectures. As shown in step 100, S uses the geometric mean of the supply parameters to make sure that no single parameter dominates the function, unless of course that parameter is severely weighted by its associated coefficient. Other factors that may be considered include, for example, the maximum population count of a basic block live inset for a code that has a large number of in-lining candidates. It will be evident to one skilled in the art that additional factors and associated weights can be used in accordance with other embodiments of the invention to provide a flexible means by which the system can analyze the performance of the application code using a wide variety of attributes.

Figure 6:
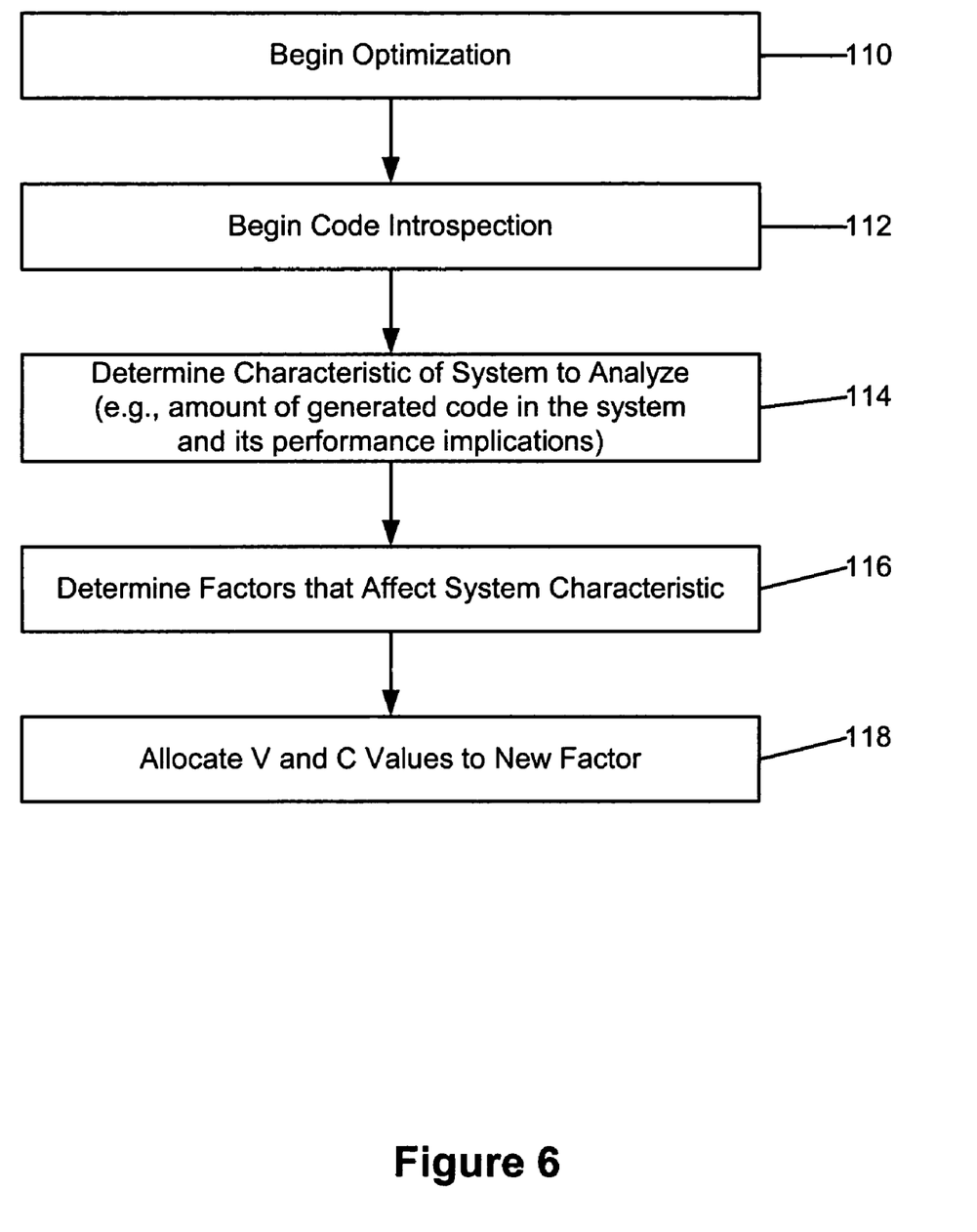
FIG. 6 illustrates a flowchart of a code introspection process in accordance with an embodiment of the invention.

FIG. 6 illustrates a flowchart of a code introspection process in accordance with an embodiment of the invention. As shown in FIG. 6, in step 112, the code introspection process begins typically when called by the code optimizer. However the code introspection process can be run at any time during the run-time environment. In step 114, the system determines the characteristics of the executing system, to analyze those factors that will effect performance. For example, high register pressure typically has a substantial effect on the system performance, and this information is quickly determined using the system performance feedback. In step 116, the system then determines those factors that effect the particular system characteristic at hand, e.g., those factors that might effect high register pressure. In step 118, values V for each system characteristic factor, and associated weights C, are assigned to each factor that effects a system characteristic. This information is then used for the feedback mechanism to assist in the code optimization process.

As described above, the system interrogates the running system to determine those characteristics that are most important to the performance of the running system, and then determines those factors that effect a particular system characteristic. In this manner, dynamic parameters collected during runtime are used for the metric. For example, in one instance a value V might be a metric that affects register pressure which depends upon a population count of insets. So for example, the $V_0$ may be chosen to be register pressure, in that register pressure is an important factor in system performance. Because register pressure is such an important factor, the associated weight for register pressure $C_0$ may also be given a high value so that the size metric takes into account to a considerable degree the register pressure in the system. Other types of factors that may be taken into account when performing a code optimization include, for example, control flow, and the number of code operations. Each of these factors may be determined by the operator if the operator has sufficient knowledge of the underlying architecture and its limitations, or in some instances can be determined automatically by the system using the feedback mechanism and code introspection mechanisms described above. An important element of the system is that certain factors can be specified or set from the start, while other factors can be determined dynamically during run-time. This addresses problems with traditional systems that utilize a standardized method for performing code optimization. Allowing the system to tailor the optimization process to best address the needs of the application code and the underlying system allows for proper balancing of conservative optimization versus aggressive optimization for those instances in which only an aggressive optimization will create the performance boost needed within the system. The size metric function can also be easily tailored and customized to run on different architectures, and to perform optimizations according to different optimization codes.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for performing adaptive optimization of application code in a virtual machine environment, the system comprising:
   an application code stored in a memory of the system;
   a server including a processor, a virtual machine, and a run-time compiler for compiling the application code;
   optimization parameters determined from information from the run-time compiler, wherein each optimization parameter is associated with a weight that reflects a relative effect the optimization parameter has on the system performance as compared to other optimization parameters; and
   an optimizer, which calculates a dynamic size metric for the application code based on the geometric mean of the weighted optimization parameters multiplied by a growth factor, and uses the dynamic size metric to optimize the application code during run-time.

2. The system of claim 1, wherein the system uses the run-time compiler to compile application code for use by the virtual machine itself.

3. The system of claim 1, wherein the system includes a plurality of application code.

4. The system of claim 1, wherein the virtual machine is a Java Virtual Machine.

5. The system of claim 1, wherein some of the optimization parameters are specified by a software developer prior to run-time.

6. The system of claim 1, wherein the size metric is evaluated by the formula;

$$S(\text{code}) = \left( \sqrt[n]{\prod_{1\ldots n} C_n V_n} \right)^x$$

and wherein v represents variables used in evaluating the size matrix, n represents the number of variables, c represents weights associated with each variable, and x represents a growth factor exponent.

7. A computer-implemented method for performing optimization of an application code in a virtual machine environment, the method comprising:
   determining optimization parameters from a run-time compiler about an application code being compiled by the run-time compiler;
   weighting each of the determined optimization parameters, wherein each weight reflects a relative effect the determined optimization parameter has on the virtual machine environment performance as compared to other determined optimization parameters;
   calculating a dynamic size metric for the application code based on the geometric mean of the weighted optimization parameters multiplied by a growth factor; and
   optimizing the application code during run-time based on the dynamic size metric.

8. The computer-implemented method of claim 7, wherein determining optimization parameters comprises compiling by the run-time compiler of the application code for use by a virtual machine in the virtual machine environment.

9. The computer-implemented method of claim 7, wherein determining optimization parameters comprises performing the determining for a plurality of application code.

10. The computer-implemented method of claim 7, wherein the virtual machine environment is a Java Virtual Machine environment.

11. The computer-implemented method of claim 7, wherein determining optimization parameters comprises specifying some of the optimization parameters by a software developer prior to run-time.

12. The computer-implemented method of claim 7, wherein the size metric is evaluated by the formula:

$$S(\text{code}) = \left( \sqrt[n]{\prod_{1\ldots n} C_n V_n} \right)^x$$

and wherein v represents variables used in evaluating the size matrix, n represents the number of variables, c represents weights associated with each variable, and x represents a growth factor exponent.

13. A computer readable storage medium including instructions stored thereon which when executed cause the computer to perform the steps of:
   determining optimization parameters from a run-time compiler about an application code being compiled by the run-time compiler;

weighting each of the determined optimization parameters, wherein each weight reflects a relative effect the determined optimization parameter has on the virtual machine environment performance as compared to other determined optimization parameters;

calculating a dynamic size metric for the application code based on the geometric mean of the weighted optimization parameters multiplied by a growth factor; and optimizing the application code during run-time based on the dynamic size metric.

14. The system of claim 1, wherein the dynamic size metric is adjusted to account for architecture specific requirements that vary from one system to another.

15. The system of claim 1, wherein the dynamic size metric is evaluated by taking the geometric mean of the weighted optimization parameters, for a number n optimization parameters v associated with a number n of weights c, wherein a growth factor exponent x is applied to the geometric mean.

16. The computer-implemented method of claim 7, further comprising adjusting the dynamic size metric to account for architecture specific requirements that vary from one system to another.

17. The computer-implemented method of claim 7, wherein the dynamic size metric is evaluated by taking the geometric mean of the weighted optimization parameters, for a number n optimization parameters v associated with a number n of weights c, wherein a growth factor exponent x is applied to the geometric mean.

* * * * *

UNITED STATES PATENT AND TRADEMARK OFFICE
CERTIFICATE OF CORRECTION

| | | |
|---|---|---|
| PATENT NO. | : 7,610,580 B2 | Page 1 of 1 |
| APPLICATION NO. | : 11/177549 | |
| DATED | : October 27, 2009 | |
| INVENTOR(S) | : Marcus Lagergren | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1145 days.

In column 8, line 7, in claim 6, delete "formula;" and insert -- formula: --, therefor.

Signed and Sealed this

Third Day of August, 2010

David J. Kappos
*Director of the United States Patent and Trademark Office*